Dec. 29, 1964    F. D. WALLBERG    3,163,331
CONDIMENT HOLDER
Filed May 22, 1963
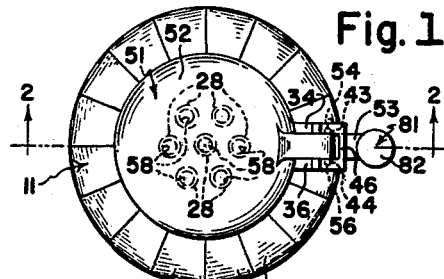
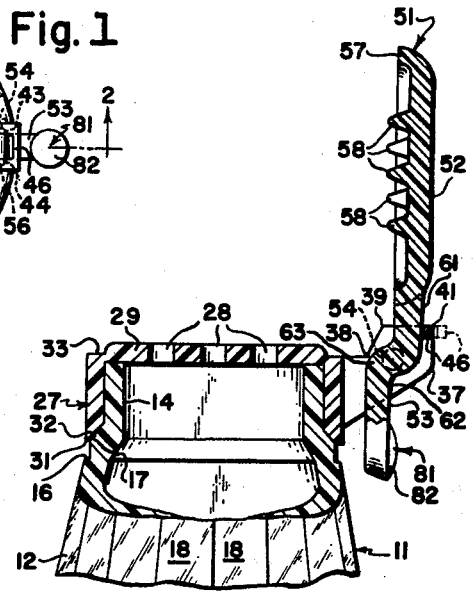
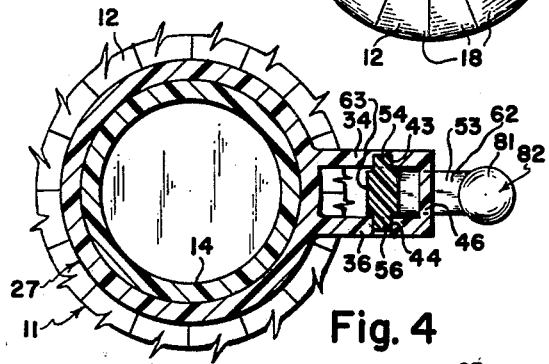
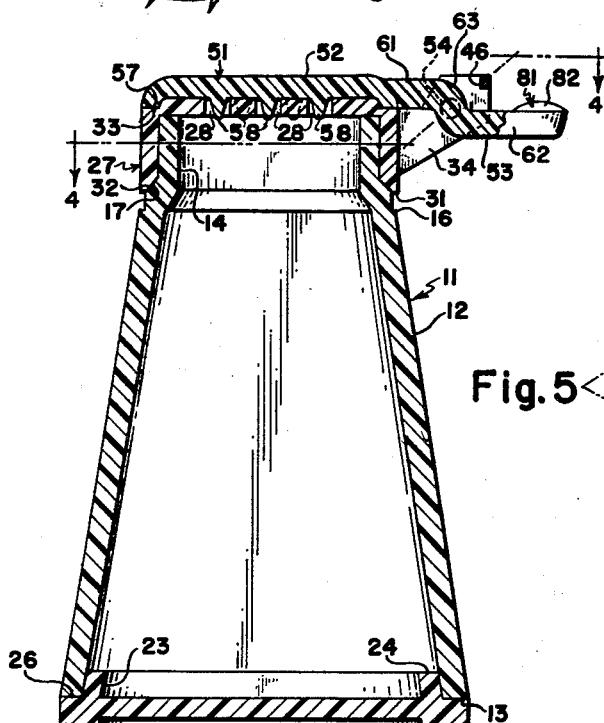
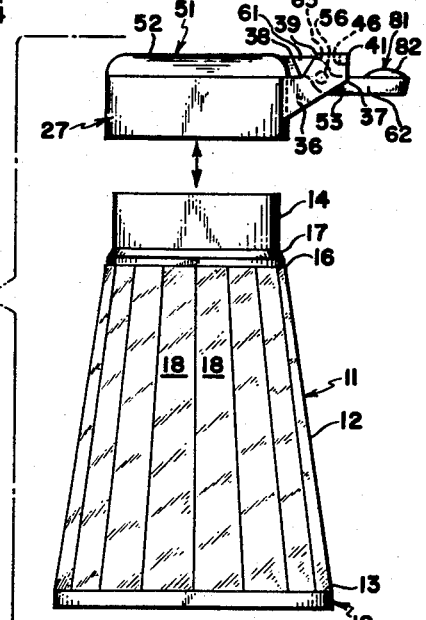
INVENTOR.
FRANK D. WALLBERG
BY John Cyril Malloy
ATTORNEY //\# United States Patent Office 3,163,331
Patented Dec. 29, 1964

3,163,331
CONDIMENT HOLDER
Frank D. Wallberg, 542 E. 15th St., Hialeah, Fla.
Filed May 22, 1963, Ser. No. 282,458
7 Claims. (Cl. 222—151)

This invention relates to condiment holders, and, more particularly to a condiment holder provided with a perforated cap for dispensing particulate material therethrough, said holder including a pivotally mounted closure adapted to be alternatively positioned over the cap and having depending teeth adapted to be seated in the perforations of the cap.

It is an object of this invention to provide a novel construction which maintains the condiments held therein relatively free from moisture.

It is a general object of this invention to provide a condiment holder of the type described hereinafter, which is relatively strong and durable, inexpensive to manufacture and otherwise well adapted for the purposes for which it is intended.

It is a specific object of this invention to provide a vessel for condiments having a perforated cap detachably mounted thereto and a pivotally mounted closure provided with depending teeth adapted to be normally received in said perforations when the holder is not in use and pivotally moved into an out of the way position in operation.

In accordance with these and other objects which will become apparent, the instant invention will now be described with reference to the accompanying drawings illustrating a preferred embodiment thereof.

In the drawings:

FIGURE 1 is a top plan view of the condiment holder;

FIGURE 2 is a side elevation view of the condiment holder in cross section taken along the line 2—2 of FIGURE 1 and looking in the direction of the arrows;

FIGURE 3 is a partial view, partly in cross section illustrating the condiment holder constructed in accordance with the instant invention with the closure in the open position;

FIGURE 4 is a plan view of the condiment holder in cross section taken along the line 4—4 of FIGURE 2; and FIGURE 5 is an exploded side elevation view illustrating the assembly of the condiment holder.

Referring particularly to the drawings, wherein like reference characters designate like or corresponding parts throughout the different views, and referring particularly to FIGURE 2, the numeral 11 designates the main vessel of the condiment holder which includes a body 12 having a bottom 13 and a neck 14. The body portion is generally of a truncated cone shape with the larger end thereof being at the bottom (see FIGURES 2 and 5). The neck 14 is generally cylindrically shaped and of a reduced diameter relative to that of the upper end 16 of the body portion. The exterior periphery of the neck is smooth and is provided with a flange 17 formed between the upper end 16 of the cone-shaped body and the lower end of the neck. The exterior surface of the cone-shaped body is provided with a series of longitudinally arranged, circumferentially short, flat surfaces 18 which are disposed tangentially about and relative to the main circular periphery of the body. A bottom 19 is provided for covering the bottom end 13 of the body. The bottom is generally disk-shaped, having a circular recess 21 in the lower or bottom surface defining a circular or circumferential foot 22 and having an annular recess 23 in the top surface defining an upwardly extending annular ring 24. The ring is offset around its outer edge as at 26 forming a shoulder. In assembly of the bottom to the body, the ring 24 is inserted into the body in male and female relation with the bottom end 13 being in abutting engagement with the shoulder 26. Adhesive means, not shown, may be disposed between the abutting surfaces of said ring and shoulder for maintaining said bottom 19 and body 12 in engagement with each other.

A smooth walled, cylindrically shaped cap 27 having a series of dispensing perforations 28 in one end 29 thereof and open at the bottom 31, which opening has beveled edges 32, is normally disposed over the neck 14 of the body with the beveled edges 32 being in abutting engagement with the aforesaid flange 17. The upwardly facing surface of the cap is provided with a peripheral groove forming a seat 33 for a purpose to be described hereinafter. The cap is further provided with a pair of thin, flat integral ears or blocks 34 and 36 which are parallel to each other and extend upwardly and outwardly from the body 12 in a general radial direction. The configuration of the ear is as shown in FIGURE 3, said ears having what is described as a first, second, third, and fourth corner designated respectively by the numerals 37, 38, 39 and 41, which are disposed upwardly and outwardly from the body and cap. In each of the ears there is provided a recess 43 and 44 which confront each other, the recesses lying in a horizontal plane which is the same as that in which the seat 33 lies. A resilient transverse member 46 joins the corners or distal ends 41 of the ears or blocks 34 and 36.

Pivotally assembled to the cap, a closure generally designated by the numeral 51 is provided. The closure comprises a circular lid 52 having an outwardly extending radial lever arm 53 provided with a transverse pin 54 and 56 extending outwardly from each side thereof and normally received in said recesses for pivotal movement of the lid relative to said cap about an axis through said pins. The underside of the lid is provided with an annular circumferential lip 57 which inter-engages with the seat 33 of the cap when in the position shown in FIGURE 2, and with a series of depending teeth which are receivable in and project through the perforations 28 of the cap. The lever arm 53 is formed with a bend downwardly upon itself and then outwardly forming a raised portion 61, a lower portion 62 and an intermediate portion 63, the pin 54 and 56 projecting from the said intermediate portion. The lever arm projects outwardly between the ears and under the member 41, as is shown in FIGURES 2, 3, 4, and 5.

In use, the teeth 58 are normally disposed in the perforations 28 which maintain them free from obstruction. A condiment may be sprinkled by pivotally moving the closure 51 about the pins by applying a pressure as indicated by the arrow 81. When the lid of the closure is in the position shown in FIGURE 3, further pressure or force upon the raised portion 82 of the distal end of the lever, the resilient member 46 expands to the dotted line position storing energy therein. Upon release of the pressure, the cap springs back into its normal position with the teeth in the perforations. The lip 57 meets with and forms a seal with the seat 33 preventing moisture from entering the vessel; in the same fashion the beveled edges 32 on the edges of the cap meet with the flanges 17.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. In a condiment holder structure including a vessel, a perforated cap normally disposed over an opening in said vessel, and a closure mounted to said cap for pivotal movement to and from a closed position relative to the cap; (a) in which said cap has a pair of parallel outwardly and upwardly projecting ears joined adjacent the distal ends thereof by a transverse resilient member; (b) in which the closure comprises a circular lid having a radially extending lever arm extending through an opening defined by said ears, member and said cap and projecting outwardly therefrom, and (c) means for detachably securing said lever arm between said ears for pivotal movement relative to a transverse axis parallel to said member.

2. A condiment holder structure as set forth in claim 1 wherein teeth project downwardly from the underside of the lid and are positioned thereon for registry in the perforations of said cap.

3. A condiment holder structure as set forth in claim 1 wherein a relative moisture-proof seal is formed by complemental flange and seat portions on said cap and closure which inter-engage when said teeth are in registry with said perforations.

4. A condiment holder comprising a (1) vessel, (2) a perforated cap, and (3) a closure;

said vessel comprising (a) a body, (b) a bottom, (c) a neck, and (d) adhesive means, said body being of a generally truncated cone-shaped configuration and having a relatively small upper end and a relatively large lower end, said upper end having an integral and smooth tubular neck of reduced diameter, said vessel having an exteriorally disposed flange formed between said neck and said upper end, the exterior surface of the body having a series of longitudinally arranged, circumferentially short, flat surfaces tangentially disposed relative to the main periphery of the body; said bottom being disk-shaped, having a circular recess in the bottom surface defining a downwardly extending circumferential foot and having an annular recess in the top surface defining an upwardly projecting annular ring having an exteriorly disposed annular offset in the upwardly projecting surface thereof defining a shoulder, said bottom being disposed in abutting relation with the lower end of said vessel, with said ring projecting into said vessel and said lower end being in abutting engagement with the axially extending surface of said ring and with said shoulder, said adhesive means being disposed between said bottom and said body maintaining said bottom and said body in engagement with each other;

said perforated cap being smoothed walled and tubular in shape and having a closed upper end and an open lower end, said upper end having dispensing perforations therethrough and an exteriorly disposed peripheral groove adjacent the upper end forming a seat, said cap having a pair of integral, thin, flat parallel ears extending outwardly in a diametrical direction, said ears having a configuration such that they join the exterior tubular surface of the cap along a line substantially parallel to the main axis of the body with the bottom edges of the ears each extending angularly in an upwardly and outwardly direction to a first corner and with the upper edges each extending outwardly in a generally horizontal direction from the plane of said seat a shorter diametrical distance than said bottom edge to a second corner and thence extending angularly along an upwardly and outwardly directed line in a diametrical direction to a third corner above the main plane of the perforated upper end and thence horizontally to a fourth corner in vertical alignment with said first corner, said corners defining a pair of confronting blocks radially and upwardly offset relative to the side and upper end of the tubular cap, the fourth corner of said ears being joined by transverse integral member, said ears having a pair of confronting transverse recesses in each of said blocks, said recesses being in the same plane as said seat, said tubular cap being normally disposed over said smooth neck of the vessel;

said closure comprising (a) a circular lid and (b) a radially extending integral arm, said circular lid having an integral, annular, circumferentially depending lip and having a series of depending integral teeth, said lever arm extending radially outwardly from the periphery of said lid, said arm being bent downwardly and outwardly forming a raised portion and a lower portion with an inclined downwardly and outwardly extending portion intermediate said raised and lowered portions, said lever arm having a pair of transversally projecting pins on each side thereof projecting from said intermediate portion and normally received in the confronting recesses of said cap for pivotal movement of said cap upon application of a downwardly directed force on the lower portion of said lever arm, said lid being normally disposed over said cap with said depending teeth being in register with said series of perforations and with said lip being seated in said seat.

5. A condiment holder as set forth in claim 4 wherein said transverse integral member is of resilient material and is adapted to have energy stored therein when said lever is depressed for release when said lever is released, said energy initially urging said lid to pivotally move into the normal position with said teeth in registery in said perforations.

6. A sprinkler assembly adapted to be mounted over the opening in a condiment vessel comprising a perforated cap and a pivotally mounted closure detachably mounted thereto; said cap having a pair of parallel ears extending outwardly and upwardly in a radial direction from said cap, each of said ears having a recess therein confronting the recess in the other ear, a resilient transverse member mounted adjacent to and joining the distal ends of said ears; said closure comprising a circular disk-shaped lid having a radially extending integral lever arm, and having a series of depending teeth on the underside thereof, said arm having a transverse aligned outwardly extending pin on each side thereof normally releasably received in said recesses with said lever arm projecting radially outwardly between said ears and between the cap and member, whereby upon an application of force to the distal end of the lever arm, said arm is adapted to pivotally move said closure relative to said cap.

7. A sprinkler assembly as set forth in claim 6 wherein said ears are of a resilient material whereby the pins of said closure are adapted to be readily released from said recesses by applying a torque to said lid.

References Cited by the Examiner

UNITED STATES PATENTS

| | | | |
|---|---|---|---|
| 743,626 | 11/03 | Duffie | 222—556 X |
| 1,628,028 | 5/27 | Calhoun | 220—32 X |
| 1,977,935 | 10/34 | Caldwell | 220—32 X |
| 2,635,792 | 4/53 | Amand et al. | 222—556 X |
| 2,833,447 | 5/58 | Thiele | 222—151 |

LOUIS J. DEMBO, *Primary Examiner.*